(12) United States Patent
Guérin et al.

(10) Patent No.: US 11,350,042 B2
(45) Date of Patent: May 31, 2022

(54) FIELD VARIABLE TONE MAPPING FOR 360 CONTENT

(71) Applicant: GoPro, Inc., San Mateo, CA (US)

(72) Inventors: Guillaume Matthieu Guérin, Chatillon (FR); Julien Caron, Guyancourt (FR)

(73) Assignee: GoPro, Inc., San Mateo, CA (US)

( * ) Notice: Subject to any disclaimer, the term of this patent is extended or adjusted under 35 U.S.C. 154(b) by 240 days.

(21) Appl. No.: 16/843,301

(22) Filed: Apr. 8, 2020

(65) Prior Publication Data

US 2021/0321029 A1 Oct. 14, 2021

(51) Int. Cl.
| | |
|---|---|
| *H04N 5/235* | (2006.01) |
| *G06T 5/20* | (2006.01) |
| *G06T 5/00* | (2006.01) |
| *G06T 3/40* | (2006.01) |

(52) U.S. Cl.
CPC ......... *H04N 5/2355* (2013.01); *G06T 3/4038* (2013.01); *G06T 5/009* (2013.01); *G06T 5/20* (2013.01)

(58) Field of Classification Search
CPC ....... H04N 5/2355; G06T 3/4038; G06T 5/20; G06T 5/009
USPC ...................................................... 348/229.1
See application file for complete search history.

(56) References Cited

U.S. PATENT DOCUMENTS

| | | | |
|---|---|---|---|
| 9,842,381 B2 | 12/2017 | Douady-Pleven | |
| 10,284,785 B2 | 5/2019 | Guerin | |
| 10,530,995 B2 | 1/2020 | Douady-Pleven | |
| 10,554,903 B2 | 2/2020 | Guerin | |
| 10,870,350 B2 * | 12/2020 | Wakatsuki | ......... G02B 27/0101 |
| 2002/0067418 A1 * | 6/2002 | I | ............................... G09G 5/14 348/333.01 |

* cited by examiner

*Primary Examiner* — Usman A Khan
(74) *Attorney, Agent, or Firm* — Young Basile Hanlon & MacFarlane, P.C.

(57) ABSTRACT

Image capture devices and methods may use field variable tone mapping for 360 content. An image capture device may comprise an image sensor and a processor. The image sensor may capture a hyper-hemispherical image that includes an image circle portion and a dark corner portion. The processor may perform local tone mapping (LTM) on a first area of the image circle portion and perform global tone mapping (GTM) on a second area of pixels of the image circle portion. The GTM may be performed on a condition that a portion of a predefined area of pixels overlaps with a stitch line. The processor may be configured to stitch the hyper-hemispherical image and a second hyper-hemispherical image at the stitch line to obtain a processed image. The processor may be configured to display, store, output, or transmit the processed image.

20 Claims, 10 Drawing Sheets

FIELD VARIABLE TONE MAPPING FOR 360 CONTENT

TECHNICAL FIELD

This disclosure relates to image processing. In particular, this disclosure relates to tone mapping for multi-image sensor content.

BACKGROUND

One of the most efficient classes of tone mapping algorithms is local tone mapping (LTM). LTM, however, requires a wide neighborhood to be computed, and is therefore not suitable for 360 degree (360) content. On pairs of fish-eye or hyper-hemispherical images, the quality and the continuity of the processing across the stitch line cannot be guaranteed using LTM since the pixels outside the image circle may modify the expected output. In equi-rectangular projection (ERP) images, the distortion on the poles may be too large, and would require a field-variable kernel that would be theoretically infinitely wide on the poles. In equi-angular cubemap (EAC) images, the continuity on the edges of both bands may not be guaranteed using LTM. Accordingly, devices and methods for performing LTM on 360 content is desired.

SUMMARY

Disclosed herein are implementations of image capture devices and methods for field variable tone mapping of 360 content. In an aspect, an image capture device may comprise an image sensor. The image sensor may be a hyper-hemispherical image sensor. The image sensor may be configured to capture a hyper-hemispherical image. The hyper-hemispherical image may include an image circle portion and a dark corner portion. A circumference of the image circle portion may represent a stitch line between the hyper-hemispherical image and a second hyper-hemispherical image. The second hyper-hemispherical image may be obtained from a second image sensor. The image capture device may include a processor. The processor may be configured to perform LTM on a first area of the image circle portion. The first area of pixels may have a first radius relative to a center of the image circle portion. The processor may be configured to perform global tone mapping (GTM) on a second area of pixels of the image circle portion. The GTM may be performed on a condition that a portion of a predefined area of pixels overlaps with the stitch line. The second area of pixels may have a second radius relative to the center of the image circle. The second radius may be greater than the first radius. The processor may be configured to stitch the hyper-hemispherical image and the second hyper-hemispherical image at the stitch line to obtain a processed image. The processor may be configured to display, store, output, or transmit the processed image.

In another aspect, a method may include obtaining a hyper-hemispherical image that includes an image circle portion and a dark corner portion. A circumference of the image circle portion may represent a stitch line between the hyper-hemispherical image and a second hyper-hemispherical image. The method may include dividing the hyper-hemispherical image into a plurality of blocks. Each block of the plurality of blocks contains a predetermined number of pixels. The method may include determining whether a block of the plurality of blocks contains a portion of the image circle portion. On a condition that the block contains a portion of the image circle portion, the method may determine whether the block overlaps with the stitch line. On a condition that the block does not overlap with the stitch line, the method may compute a neighborhood luminance of a pixel of the predetermined number of pixels. The method may include applying a gain to the pixel based on the neighborhood luminance. On a condition that the block overlaps with the stitch line, the method may include determining a distance of the pixel from a center of the image circle portion. The method may include computing a luminance of the pixel. The method may include applying a gain to the pixel based on the luminance. The method may include applying an attenuation map to the pixel based on the determined distance of the pixel from the center of the image circle portion. The method may include stitching the hyper-hemispherical image and the second hyper-hemispherical image at their respective stitch lines to obtain a processed image. The method may include displaying, storing, outputting, or transmitting the processed image.

In another aspect, an image capture device may include a first image sensor, a second image sensor, and a processor. The first image sensor may be configured to capture a first hyper-hemispherical image. The first hyper-hemispherical image may include a first image circle portion and a first dark corner portion. A circumference of the first image circle portion may represent a first stitch line. The second image sensor may be configured to capture a second hyper-hemispherical image. The second hyper-hemispherical image may include a second image circle portion and a second dark corner portion. A circumference of the second image circle portion may represent a second stitch line. The processor may be configured to perform LTM on a first area of pixels of the first image circle portion. The first area of pixels may have a first radius relative to a center of the first image circle portion. The processor may be configured to perform GTM on a second area of pixels of the first image circle portion on a condition that a portion of a predefined area of pixels overlaps with the stitch line. The second area of pixels may have a second radius relative to the center of the first image circle portion. The second radius may be greater than the first radius. The processor may be configured to stitch the first hyper-hemispherical image and the second hyper-hemispherical image at the first and second stitch lines to obtain a processed image. The processor may be configured to display, store, output, or transmit the processed image.

In one or more aspects, the processor may be configured to perform LTM on each pixel of the first area of pixels based on the predefined area of pixels. In one or more aspects, the predefined area of pixels may be approximately a 100×100 pixel area. In one or more aspects, the processor may be configured to perform LTM on each pixel of the first area of pixels to remove low frequency variations. In one or more aspects, the processor may be configured to perform LTM on each pixel of the first area of pixels to preserve or enhance high frequency details. In one or more aspects, the processor may be configured to output the processed image in an equi-angular cubemap (EAC) format. In one or more aspects, the processor may be configured to output the processed image in a stitched pair fish-eye format. In one or more aspects, the processor may be configured to divide the hyper-hemispherical images into a plurality of blocks that contain a predetermined number of pixels. In one or more aspects, the neighborhood luminance may be an average luminance of the predetermined number of pixels. In one or more aspects, the average luminance may be a weighted average of the luminance of the predetermined number of pixels. In one or more aspects, each block may have approximately a 100×100 pixel area. In one or more aspects, the attenuation map may be applied to a smoothed luminance of the pixel. In one or more aspects, the attenuation map may be applied to a local contrast enhancement strength of the pixel.

In one or more aspects, LTM may be performed on a third area of pixels of the second image circle portion. The third area of pixels may have a third radius relative to a center of the second image circle portion. In one or more aspects, GTM may be performed on a fourth area of pixels of the second image circle portion on a condition that a portion of the predefined area of pixels overlaps with the second stitch line. The fourth area of pixels may have a fourth radius relative to the center of the second image circle portion. The fourth radius may be greater than the third radius. In one or more aspects, the processor may be configured to perform LTM on each pixel of the first area of pixels and the third area of pixels based on the predefined area of pixels. In one or more aspects, the processor may be configured to perform LTM on each pixel of the first area of pixels and the third area of pixels to remove low frequency variations. In one or more aspects, the processor may be configured to perform LTM on each pixel of the first area of pixels and the third area of pixels to preserve or enhance high frequency details. In one or more aspects, the processor may be configured to perform a combination of LTM and GTM on a fifth area of pixels of the first image circle portion. The fifth area of pixels may be between the first area of pixels and the second area of pixels. In one or more aspects, the combination may be based on the attenuation map.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In a dual-lens image capture device example, RAW fish-eye images respective two circular images surrounded by dark pixels, one circular image for the front lens and the second circular image for the back lens. Valid pixels are contained into an area that may be referred to as an image circle. Applying GTM on these images is possible and currently performed in image capture devices. GTM with identical parameters on both images does not prevent from correctly stitching the front and back images for the generation of 360 content stored in specific formats, such as EAC and equi-rectangular projection (ERP). An EAC image format includes two bands of a cube where each band is composed of three cube faces. The 360 content from two hyper-hemispherical image sensors may be projected on this cube. The external edges of each band represent the respective stitch lines for each band. The two bands may be stored as rectangular images and stored in a single EAC image format by vertical concatenation.

LTM application is more delicate on 360 content than single rectangular images because of a continuity constraint between the two fish-eye images, which may not be guaranteed by the local filtering applied independently on each image. LTM may create artifacts close to the outer edge of the image circle because of the surrounding dark pixels. On rectangular images, an image extension may be performed, however this is not possible on circular images, and would be computationally expensive. In addition, stitching the content requires similar content, for example similar luminance, similar chrominance, or both, near the stitch line. Applying LTM to each image separately would lead to undesirable image quality near the stitch line.

The implementations described herein enable local tone mapping processing on 360 content while processing any 360 image format such as, for example, fish-eye pairs or EAC format images, by applying LTM processing in the areas that are not impacted by border or continuity issues between bands or lenses, for example, in the center of each fish-eye image. The implementations described herein may progressively converge toward GTM with shared parameters between the two hemispheres of a fish-eye pair or the two bands of an EAC image when approaching the area where continuity is required for stitching. Accordingly, the resulting 360 image will show no differences in the areas near the stitch line where it is necessary to have the same kind of processing, and the benefit of LTM is preserved in other areas of the image.

Figure 1A:
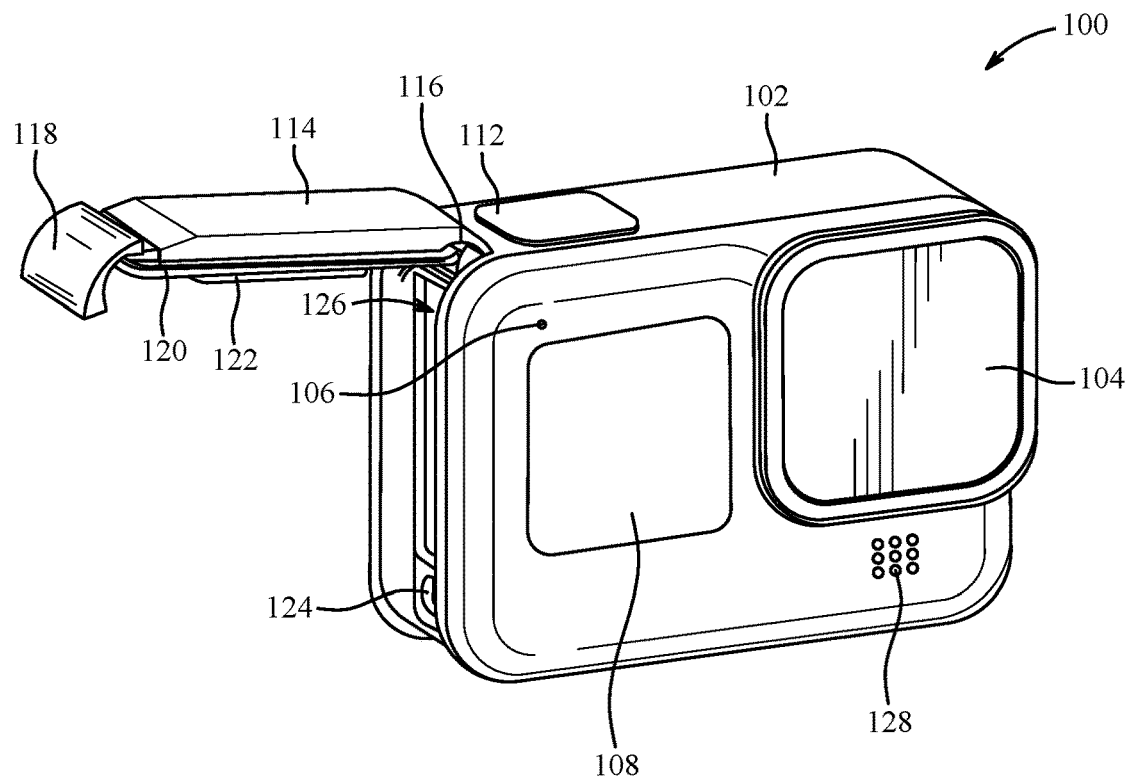
FIGS. 1A-B are isometric views of an example of an image capture device.
Figure 1B:
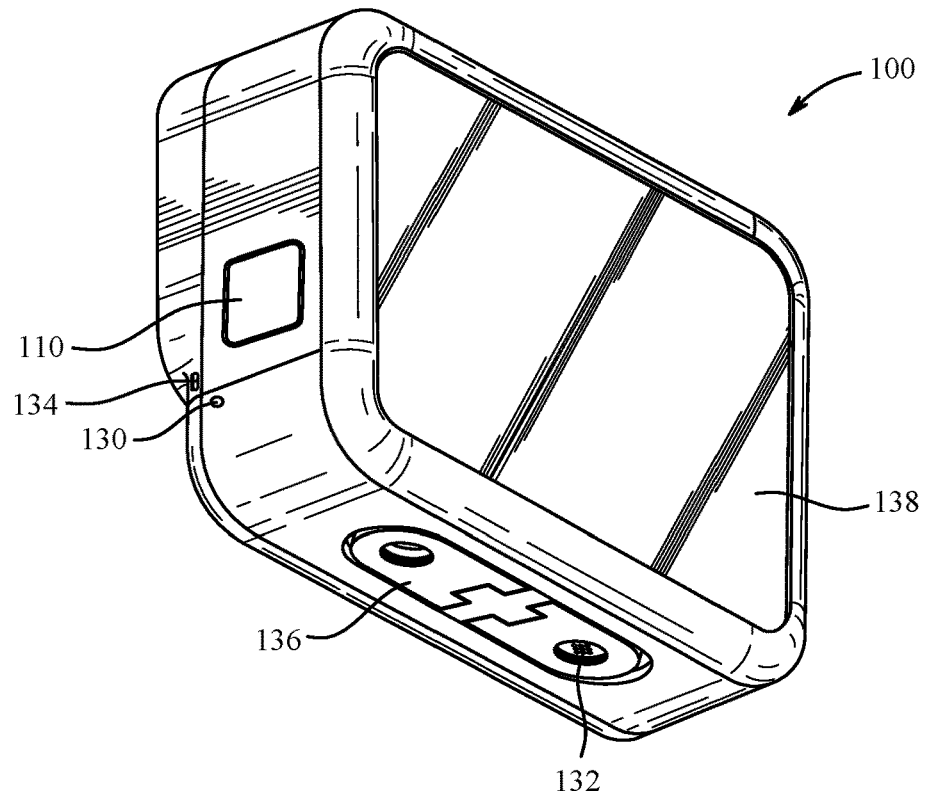

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 7:
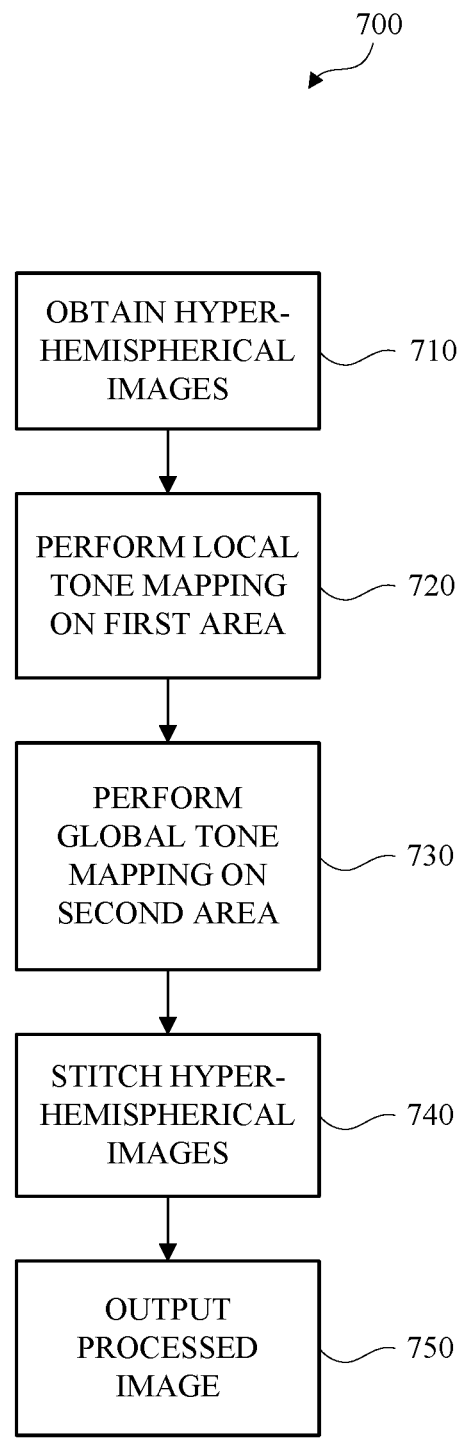
FIG. 7 is a flow diagram of an example of a method for field variable tone mapping.
Figure 8:
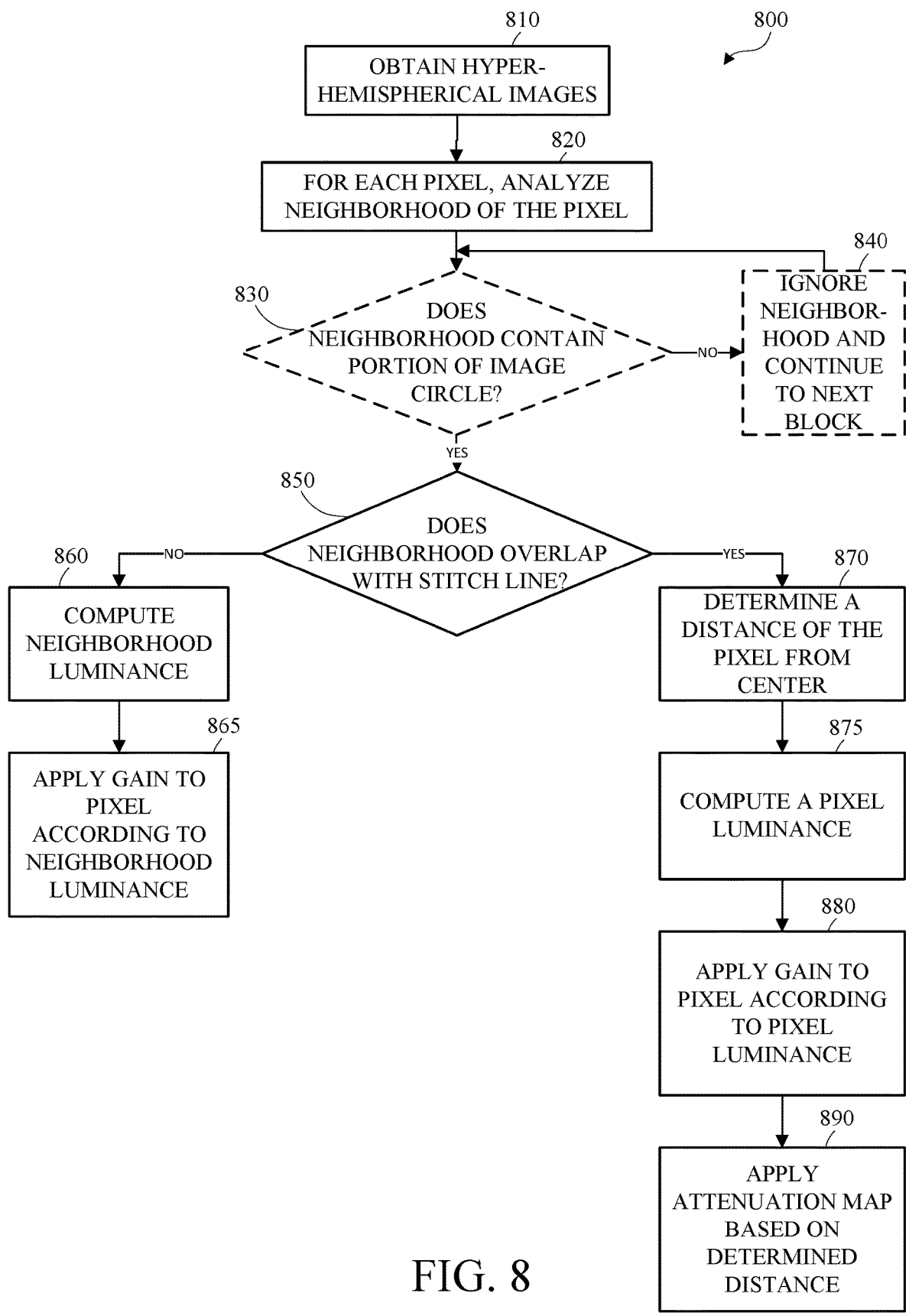
FIG. 8 is a flow diagram of an example of another method for field variable tone mapping.

The image capture device 100 may be used to implement some or all of the techniques described in this disclosure, such as the technique 700 described in FIG. 7 or technique 800 described in FIG. 8.

Figure 2A:
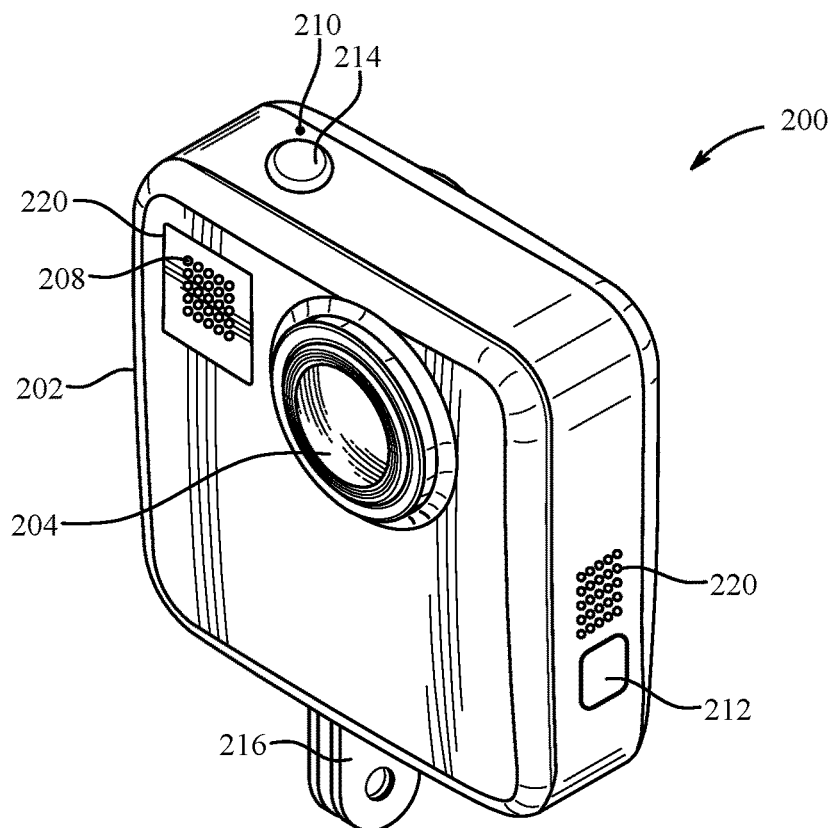
FIGS. 2A-B are isometric views of another example of an image capture device.
Figure 2B:
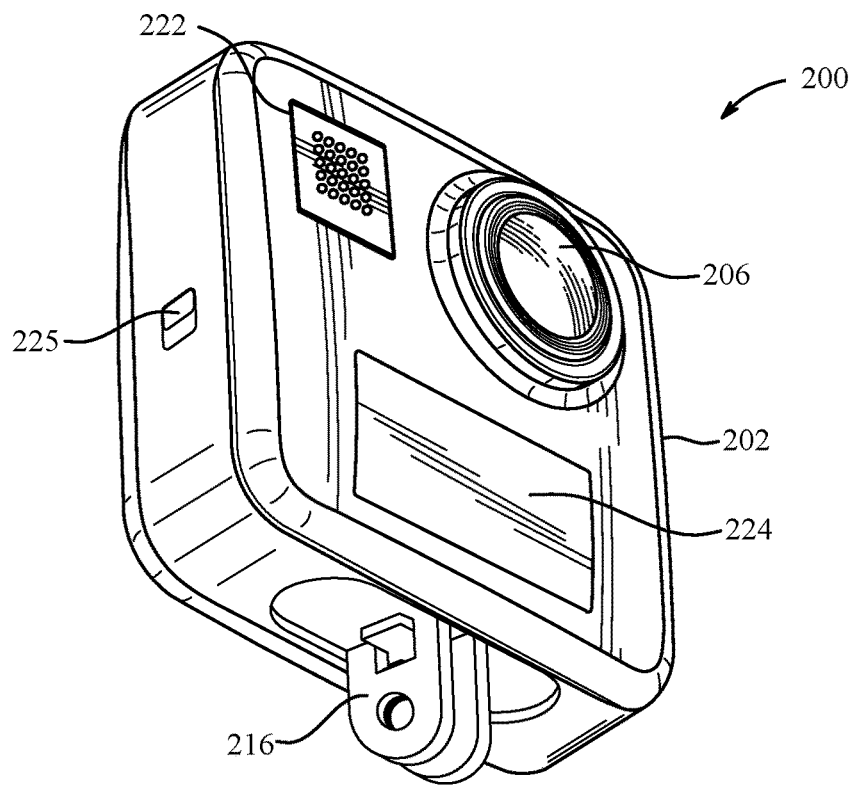

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
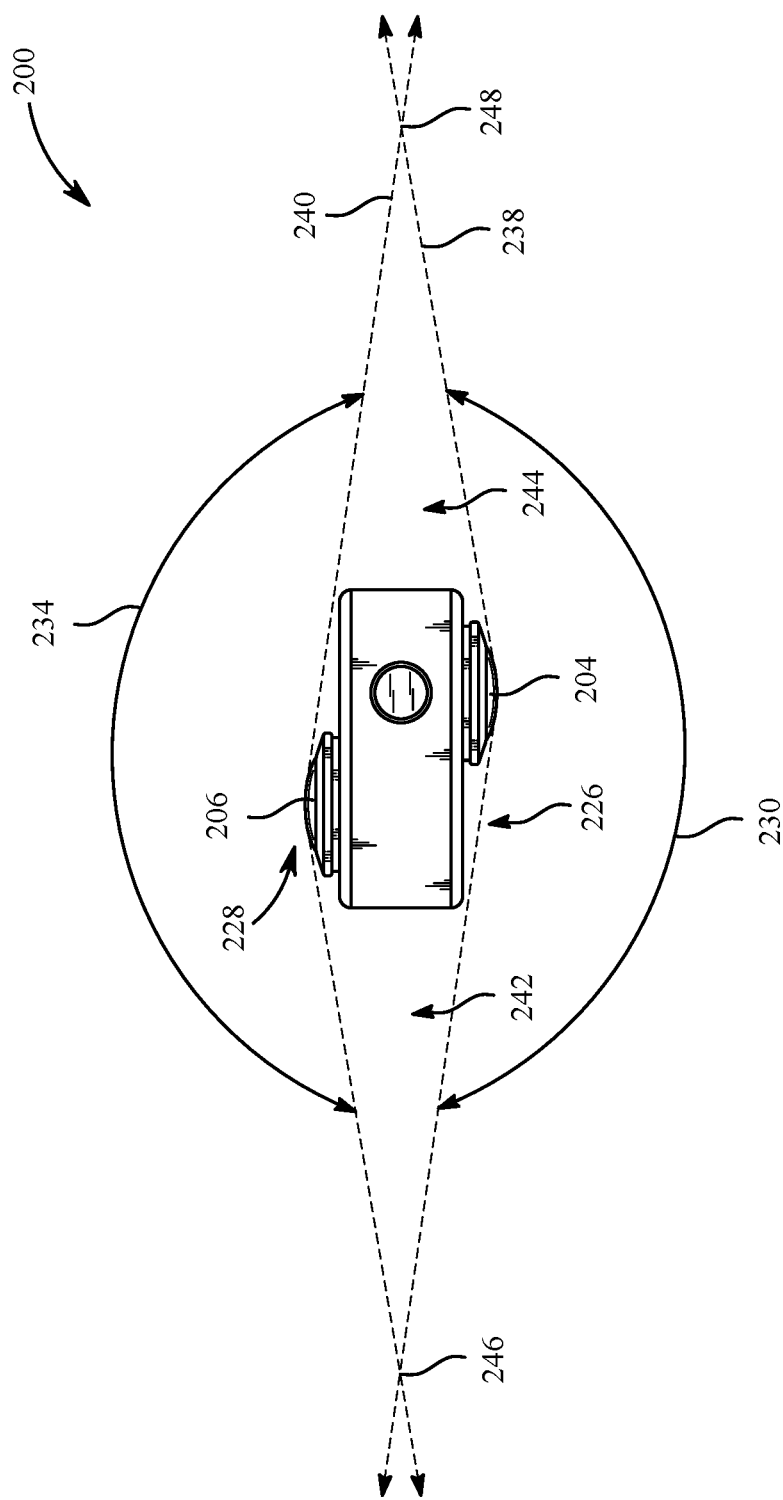
FIG. 2C is a top view of the image capture device of FIGS. 2A-B.
Figure 2D:
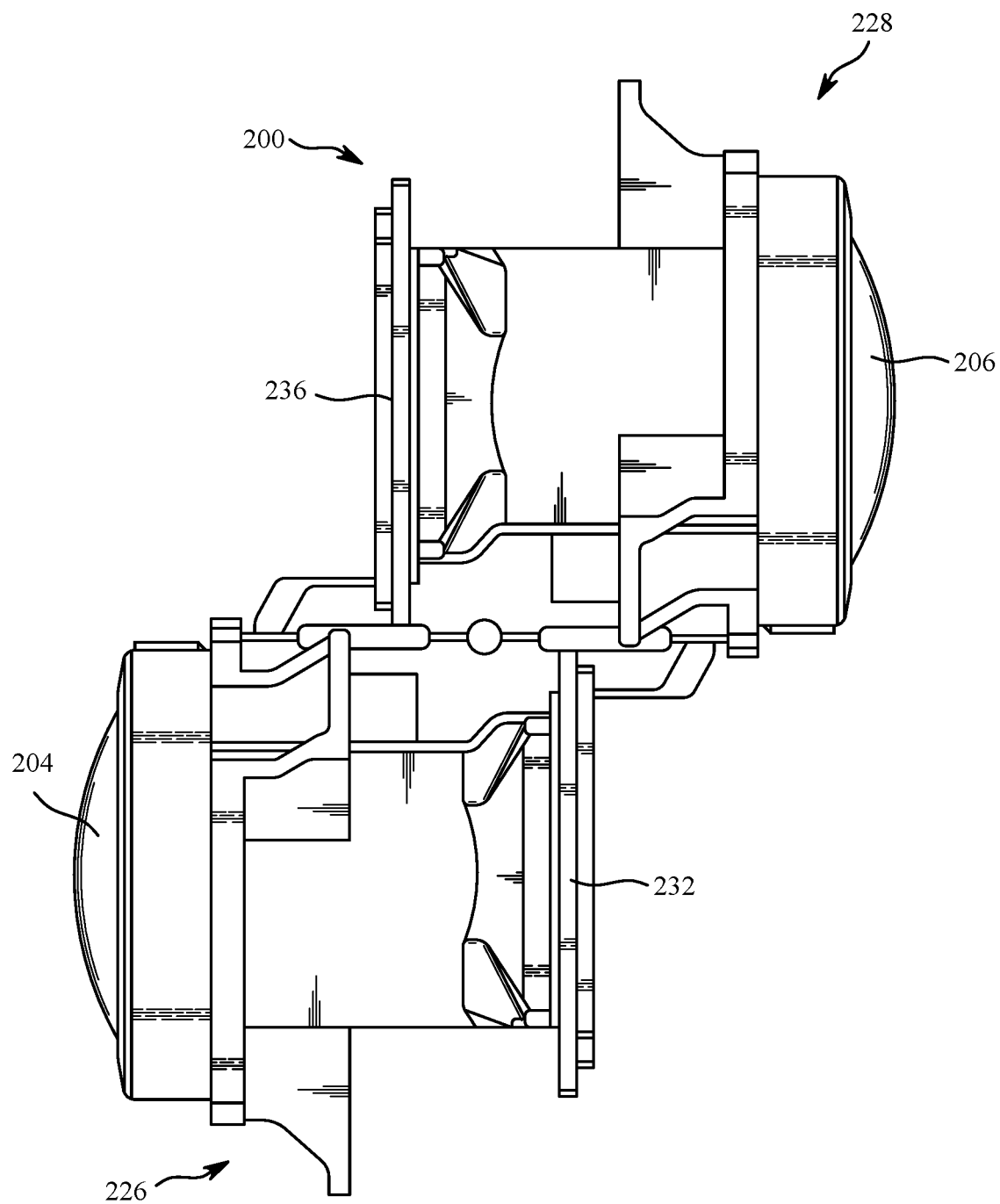
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 700 described in FIG. 7 or technique 800 described in FIG. 8.

Figure 3:
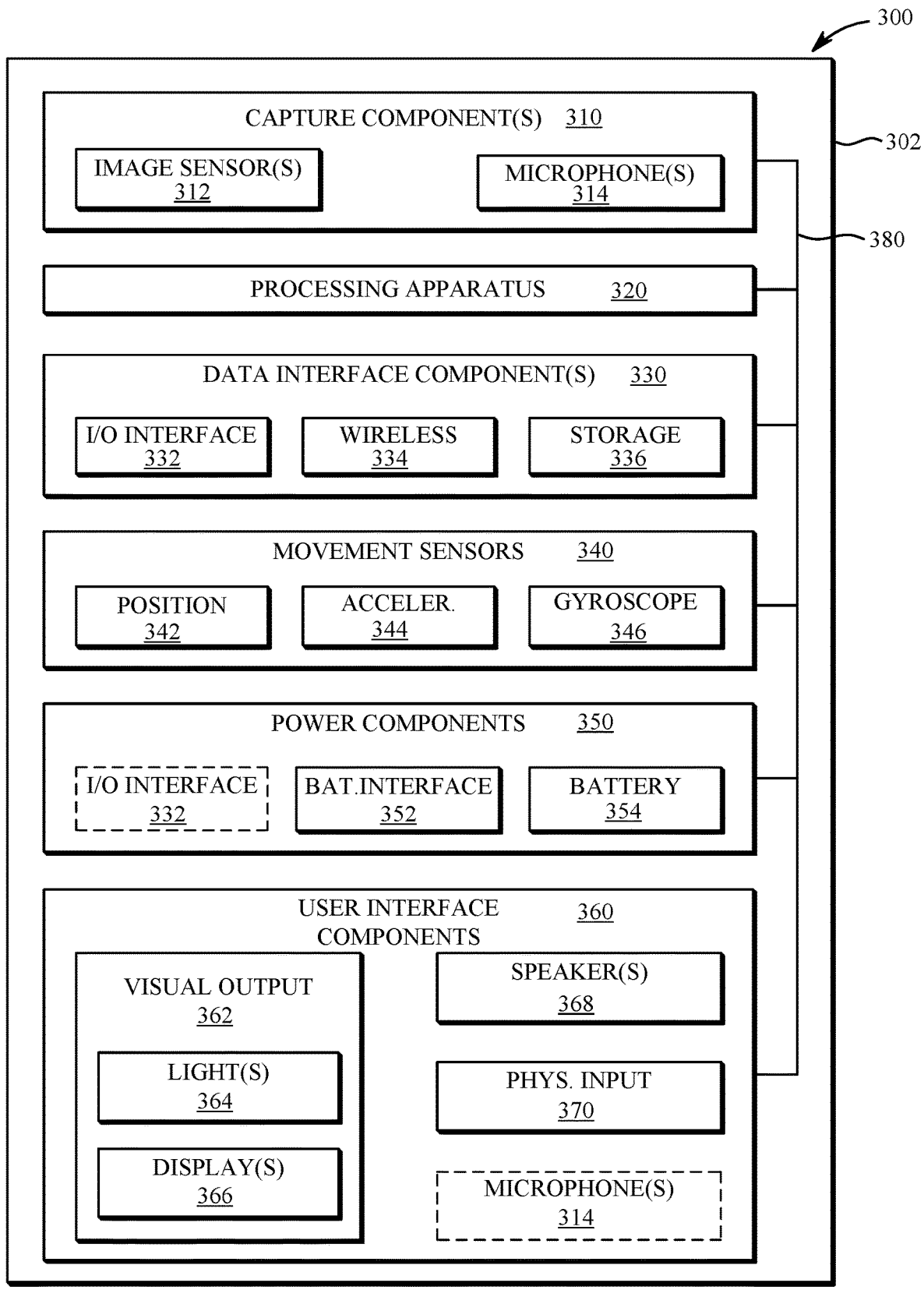
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may include an attenuation map. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 700 described in FIG. 7 or technique 800 described in FIG. 8.

Figure 4:
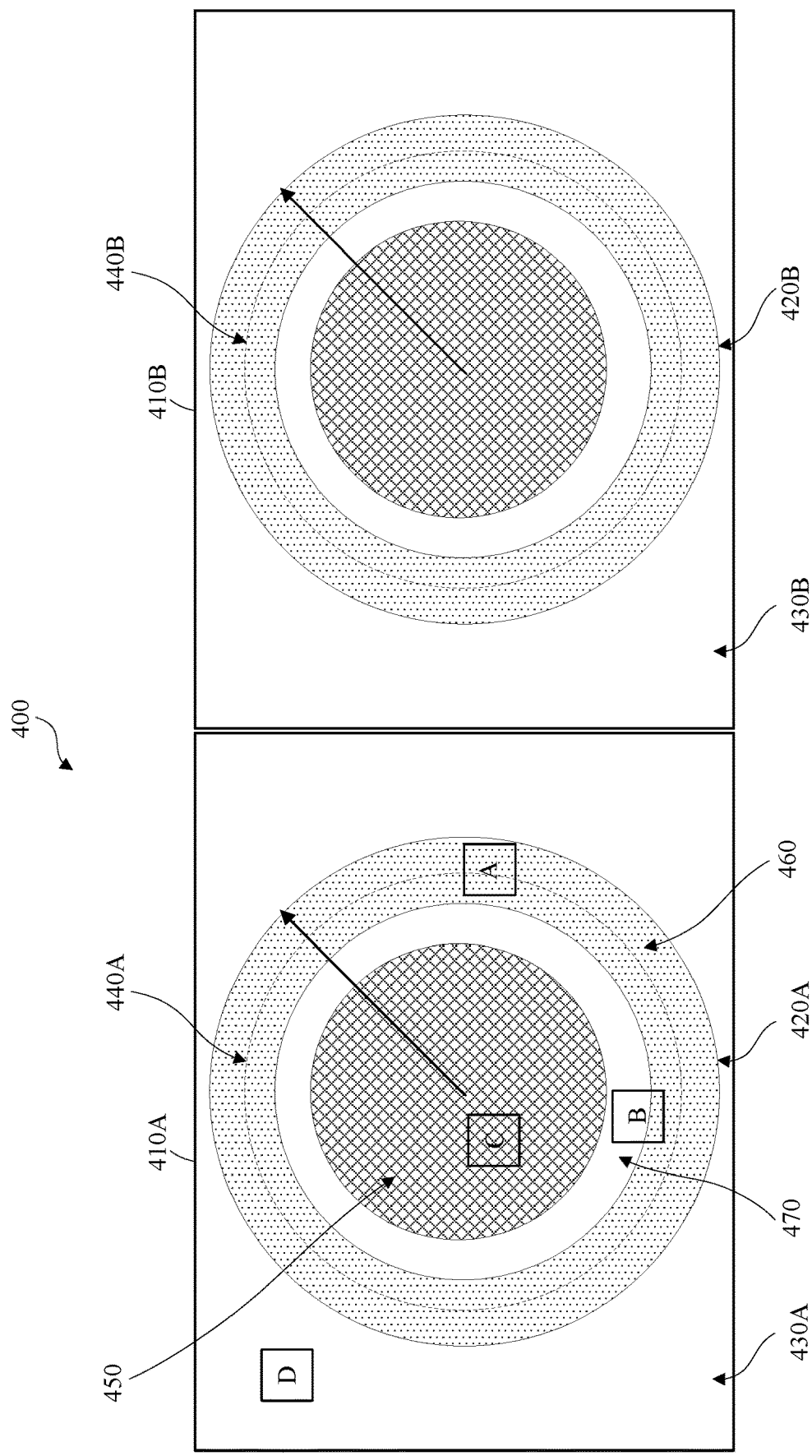
FIG. 4 is a diagram of an example of a tone mapping process applied in a pair of fish-eye images.

FIG. 4 is a diagram of an example of a tone mapping process 400 applied in a pair of fish-eye images. As shown in FIG. 4, the tone mapping process 400 includes obtaining a or one, e.g., a first hyper-hemispherical image 410A from a first image sensor and another, e.g., a second hyper-hemispherical image 410B from a second image sensor. Each hyper-hemispherical image 410A and 410B includes an image circle portion 420A and 420B, respectively, and a dark corner portion 430A and 430B, respectively. The dark corner portions 430A and 430B do not contain any image data and are formed when hyper-hemispherical images are projected onto a rectangular image sensor.

Each image circle portion 420A and 420B includes a stitch line 440A and 440B, respectively. The image circle portions 420A and 420B are stitched together at the stitch lines to obtain a 360 image.

The tone mapping process 400 includes analyzing, for each pixel, a neighborhood of the pixel. Each neighborhood may be referred to as a block, and may be of any dimension and contain any number of pixels. In one example, each block may include a wide neighborhood of 100×100 pixels. The pixel being analyzed may be at or near the center of the neighborhood or block. For each pixel, a weighted average luminance is computed using neighbor pixels in the block centered on that pixel. This processing may be referred to as sliding window processing or image filtering, where each analyzed pixel of the output image is the result of the same function applied to all the pixels in the neighborhood of the analyzed pixel. The tone mapping process 400 may process the blocks that contain a portion of an image circle, such as blocks A, B, and C. The tone mapping process 400 may ignore blocks that do not contain a portion of an image circle, such as block D. In this example, block D would not be processed.

As shown in FIG. 4, the tone mapping process 400 includes performing LTM on a portion 450 of the image circle (shown in cross-hatching) where the block does not overlap with the stitch line 440A, for example, block C. LTM techniques may change the pixel intensity depending on the intensity of its neighboring pixels per the following:

$$g_{LTM}(x) = \Phi(\{Y(t) s.t. t \in N(x)\})$$  Equation (1)

where $N(x)$ is the set of pixels in the neighborhood of x, $Y(t)$ is the luminance of pixel t and $\Phi$ is the function for computation of $g_{LTM}(x)$. LTM may be used to preserve or enhance details in the image, but it can also change the global exposure. For example, LTM may be used to remove low frequency variations, preserve or enhance high frequency details, or both. In the example LTM algorithm, the gain depends on $\bar{y}(x)$, a filtered version of the image luminance component. This filtered luminance also depends on the neighborhood of pixel x.

The tone mapping process 400 includes performing GTM on a portion 460 of the image circle (shown in stippling) where the block, such as block A, overlaps with the stitch line 440A. GTM techniques may include the application of a gain $g_{GTM}(x)$ at pixel x determined by the ratio $$g_{GTM}(x) = \frac{TC(Y(x))}{Y(x)}$$  Equation (2)

where the techniques may depend on a tone curve TC and luminance $Y(x)$ of pixel x.

As shown in FIG. 4, the LTM processing is performed in the areas that are not impacted by border or continuity issues, such as areas near the center of the image circles 420A and 420B (e.g., block C) and GTM is performed in the areas that are impacted by border or continuity issues, such as portion 460. GTM may be performed when the neighborhood or block intersects with the stitch line 440A or 440B or the dark corners 430A or 430B of the image. In some examples, a combination of LTM and GTM may be performed in a portion 470 of the image circle between portion 450 and portion 460. In portion 470, the amount of LTM and GTM applied may be based on an attenuation map. The attenuation map may be based on the distance of a pixel from the center of the image circle. For example, the amount of GTM applied may progressively increase according to the attenuation map as the pixel being processed approaches the stitch line 440A.

Figure 5:
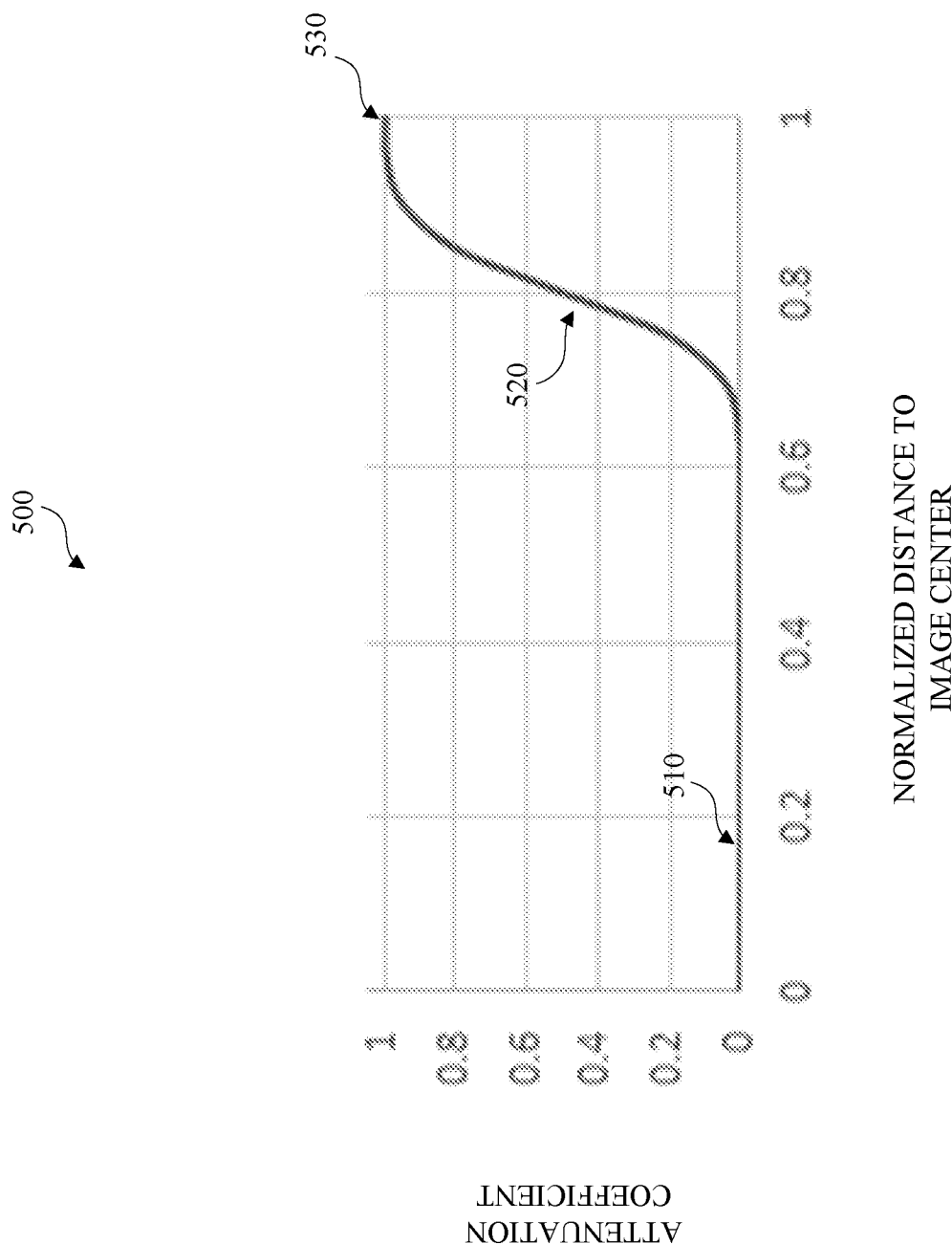
FIG. 5 is a graph of an example of a radial profile of an attenuation map.

FIG. 5 is a graph of an example of a radial profile of an attenuation map 500. The attenuation map shows an attenuation coefficient function based on a normalized distance to an image center. As shown in FIG. 5, the x-axis indicates the normalized distance to the image center, where 0 represents the center of the image circle and 1 represents the outer edge of the image circle. The y-axis indicates the attenuation coefficient, where 0 represents no attenuation (i.e., 100% LTM application) and 1 represents 100% attenuation (i.e., 100% GTM application). It can be seen that no attenuation is applied near the center of the image circle, for example the pixels at point 510. As the distance of the pixels increase from the center of the image circle, GTM is progressively applied, for example the pixels at point 520. As the stitch line is approached, 100% GTM is applied to the pixels at point 530.

Figure 6:
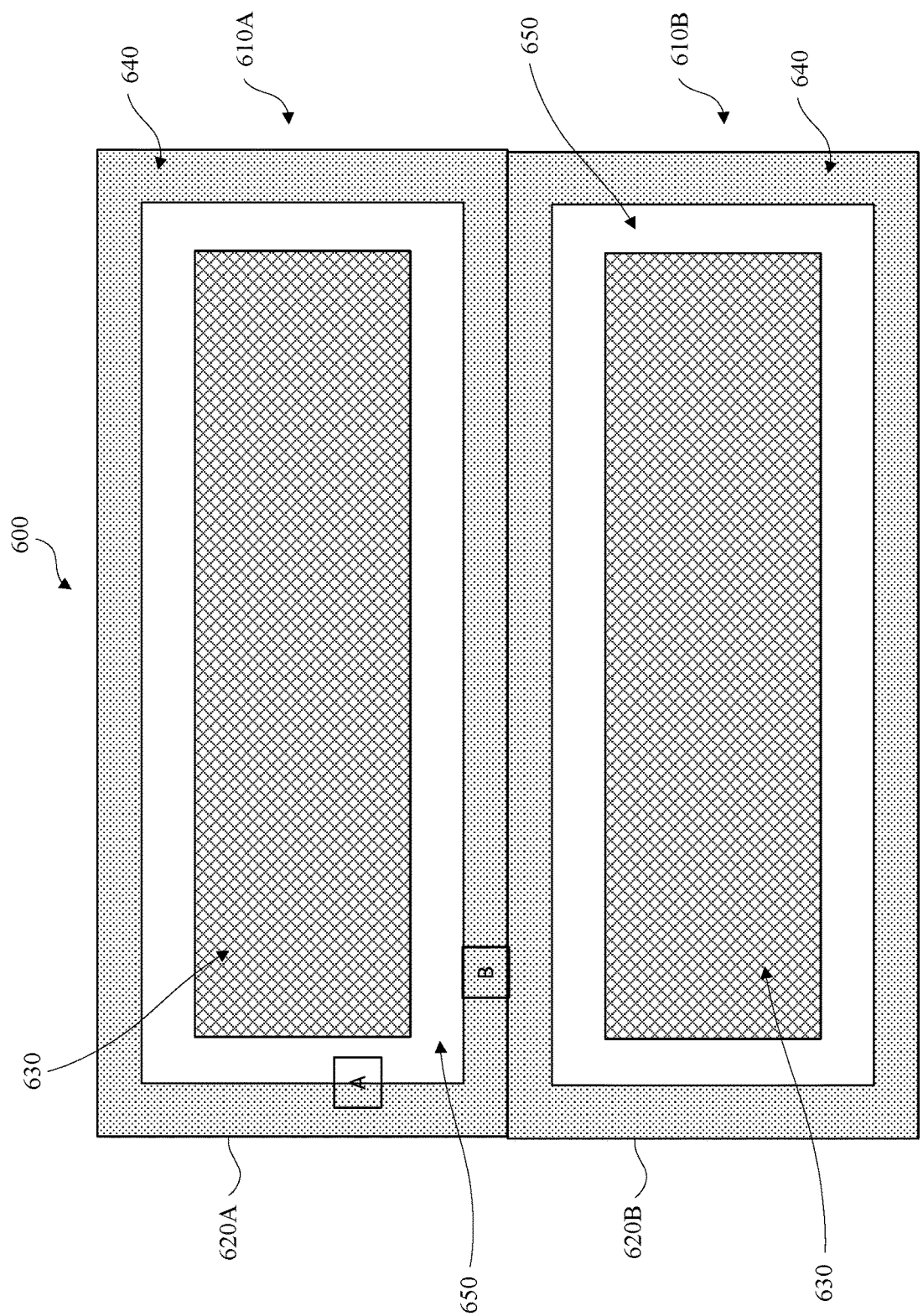
FIG. 6 is a diagram of an example of a tone mapping process applied in an equi-angular cubemap (EAC) format image.

FIG. 6 is a diagram of an example of a tone mapping process 600 applied in an EAC format image. As shown in FIG. 6, the tone mapping process 600 includes obtaining a first hyper-hemispherical image from a first image sensor, shown as a first band 610A, and a second hyper-hemispherical image from a second image sensor, shown as a second band 610B.

Each band 610A and 610B includes a stitch line 620A and 620B, respectively. As shown in FIG. 6, the stitch lines 620A and 620B correspond to the outer perimeter of their respective bands. The bands 610A and 610B are stitched together at the stitch lines to obtain a 360 image represented by six faces of a cube.

The tone mapping process 600 includes analyzing, for each pixel, a neighborhood of the pixel. Each neighborhood may be referred to as a block, and may be of any dimension and contain any number of pixels. In one example, each block may include a wide neighborhood of 100×100 pixels. The pixel being analyzed may be at or near the center of the neighborhood or block. For each pixel, a weighted average luminance is computed using neighbor pixels in the block centered on that pixel. This processing may be referred to as sliding window processing or image filtering, where each analyzed pixel of the output image is the result of the same function applied to all the pixels in the neighborhood of the analyzed pixel.

As shown in FIG. 6, the tone mapping process 600 includes performing LTM on a portion 630 of each band (shown in cross-hatching) where the respective blocks do not overlap with the respective stitch lines 620A and 620B. The LTM techniques applied may change the pixel intensity depending on the intensity of its neighboring pixels per Equation (1) above. LTM may be used to preserve or enhance details in the image, but it can also change the global exposure. In the example LTM algorithm, the gain depends on a filtered version of the image luminance component. This filtered luminance also depends on the neighborhood of pixel x.

The tone mapping process 600 includes performing GTM on a portion 640 of each band (shown in stippling) where a respective block, such as block A, overlaps with the respective stitch lines 620A or 620B. GTM may be performed on a block, such as block B, that intersects with the other band or the boundary of EAC image. GTM techniques may include the application of a gain $g_{GTM}(x)$ at pixel x determined by the ratio shown in Equation (2) above.

As shown in FIG. 6, the LTM processing is performed in the areas that are not impacted by border or continuity issues, such as areas near the center of the bands 610A and 610B and GTM is performed in the areas that are impacted by border or continuity issues, such as portion 640. In some examples, a combination of LTM and GTM may be performed in a portion 650 of the respective bands between portion 630 and portion 640. In portion 650, the amount of LTM and GTM applied may be based on an attenuation map. The attenuation map may be based on the distance of a pixel from the outer perimeter of each respective band. For example, the amount of GTM applied may progressively increase according to the attenuation map as the pixel being processed approaches the stitch line 620A and 620B.

FIG. 7 is a flow diagram of an example of a method 700 for field variable tone mapping. As shown in FIG. 7, the method 700 includes obtaining 710 one or more hyper-hemispherical images, for example, a first hyper-hemispherical image from a first image sensor and a second hyper-hemispherical image from a second image sensor. The hyper-hemispherical images may be in a fish-eye format, and ERP image format, or an EAC image format. In a fish-eye format example, each hyper-hemispherical image includes an image circle portion and a dark corner portion. The dark corner portions do not contain any image data and are formed when hyper-hemispherical images are projected onto a rectangular sensor.

Each hyper-hemispherical image includes a stitch line. In a fish-eye format example, each image circle portion contains a stitch line at or near the outer circumference of the image circle portion. A radius of the image circle portion may be larger than a radius of the stitch line. In an EAC image format example, the outer perimeter of each band is the stitch line. The hyper-hemispherical images are stitched together at the stitch lines to obtain a 360 image.

The method 700 includes performing 720 LTM on a first area of the hyper-hemispherical image. The first area of the hyper-hemispherical image may be an area where a block of a predetermined size does not overlap with the stitch line. The block may correspond to a neighborhood, and may include, for example, a pixel area of approximately 100×100 pixels. LTM techniques may change the pixel intensity depending on the intensity of its neighboring pixels per Equation (1) above. LTM may be used to preserve or enhance details in the image, but it can also change the global exposure. In the example LTM algorithm, the gain depends on a filtered version of the image luminance component. This filtered luminance also depends on the neighborhood of the pixel.

The method 700 includes performing 730 GTM on a second area of the hyper-hemispherical image where the block overlaps with the stitch line. GTM techniques may include the application of a gain $g_{GTM}$ (x) at pixel x determined by the ratio shown in Equation (2) above.

The LTM processing is performed in the areas that are not impacted by border or continuity issues, such as areas near the center of the hyper-hemispherical images and GTM is performed in the areas that are impacted by border or continuity issues. In some examples, a combination of LTM and GTM may be performed in a portion of the hyper-hemispherical images. In these examples, the amount of LTM and GTM applied may be based on an attenuation map. The attenuation map may be based on the distance of a pixel from the center of the image circle, or the distance of a pixel from the stitch line. For example, the amount of GTM applied may progressively increase according to the attenuation map as the pixel being processed approaches the stitch line.

The method 700 includes stitching 740 the hyper-hemispherical images to obtain a processed image. The processed image may include 360 content. The processed image may be stored or output 750 in any 360 output image format, for example, a paired fish-eye image format, an ERP image format, or in an EAC image format.

FIG. 8 is a flow diagram of an example of another method 800 for field variable tone mapping. The method 800 includes obtaining 810 one or more hyper-hemispherical images, for example, a first hyper-hemispherical image from a first image sensor and a second hyper-hemispherical image from a second image sensor. The hyper-hemispherical images may be in a fish-eye format, and ERP image format, or an EAC image format. In a fish-eye format example, each hyper-hemispherical image includes an image circle portion and a dark corner portion. The dark corner portions do not contain any image data and are formed when hyper-hemispherical images are projected onto a rectangular sensor.

Each hyper-hemispherical image includes a stitch line. In a fish-eye format example, each image circle portion contains a stitch line at or near the outer circumference of the image circle portion. A radius of the image circle portion may be larger than a radius of the stitch line. In an EAC image format example, the outer perimeter of each band is the stitch line. The hyper-hemispherical images are stitched together at the stitch lines to obtain a 360 image.

The method 800 includes analyzing 820, for each pixel, a neighborhood of the pixel. Each neighborhood may be referred to as a block, and may be of any dimension and contain any number of pixels. In one example, each block may include a wide neighborhood of approximately 100× 100 pixels. The pixel being analyzed may be at or near the center of the neighborhood or block.

In a fish-eye format example, method 800 includes determining 830 whether a neighborhood or block contains a portion of an image circle. If the block does not contain a portion of the image circle, the method 800 may include ignoring 840 the block and continuing to the next block. In an EAC image format example, the steps 830 and 840 may be skipped since this format does not include an image circle.

The method 800 includes determining 850 whether the block overlaps with the stitch line, an image border of the EAC image, an image border of another band, or any combination thereof. If the block does not overlap with the stitch line, the image border, or the other band, the method 800 includes computing a neighborhood luminance for a pixel. The pixel may be a center pixel in a neighborhood of pixels. A neighborhood may be of any dimension and contain any number of pixels. In one example, the neighborhood may be a wide neighborhood of approximately 100×100 pixels. The neighborhood luminance may be a weighted average luminance of a predetermined number of pixels, for example, the neighborhood of pixels. A non-linear filter, such as a bilateral filter or a guided filter, may be used to preserve the large luminance transitions and obtain the weighted average luminance. As shown in FIG. 8, the method includes applying 865 a gain to the pixel. The gain applied to the pixel may be based on the neighborhood luminance. The method 800 may then continue to the next block.

If the block does overlap with the stitch line, the image border, or the other band, the method 800 includes determining 870 a distance of the pixel from the center of the hyper-hemispherical image. The method 800 includes computing 875 a pixel luminance and applying 880 a gain to the pixel based on the pixel luminance. In an example, the method 800 may include applying 890 an attenuation map. The attenuation map may be based on the determined distance of the pixel from the center of the hyper-hemispherical image, a determined distance of the pixel from the stitch line, or both. The method 800 may then continue to the next block.

The attenuation map may be applied to smoothed luminance, local contrast enhancement strength, or both. Let $M_{att}(x)$ be the value of the radial attenuation map at pixel x in interval [0, 1]. The smoothed luminance is blended with the pixel luminance by:

$$y_{ref}(x)=(1-M_{att}(x))\times \bar{y}(x)+M_{att}(x)\times y(x) \qquad \text{Equation (3)}$$

in order to use $y_{ref}(x)$ in the gain calculation block for tone mapping of the low frequency part of the image, as shown below in Equation (4).

$$g_{LTM,1}(x) = \frac{TC(y_{ref}(x))}{y_{ref}(x)} \quad \text{Equation (4)}$$

The attenuation map may also be used for the reduction of details enhancement by reducing the related coefficients $G_{mid}$ and $G_{high}$ respectively for mid-frequencies and high-frequencies enhancement, as shown below in Equation (5) and Equation (6).

$$G'_{mid}(x)=(1-M_{att}(x))\times G_{mid}(x)+M_{att}(x) \quad \text{Equation (5)}$$

$$G'_{high}(x)=(1-M_{att}(x))\times G_{high}(x)+M_{att}(x) \quad \text{Equation (6)}$$

When the attenuation map is equal to 1, the detail enhancement gains are also equal to 1. A second gain is computed for details enhancement $g_{LTM,2}(x)$ as a function of $\bar{y}(x)$, $y(x)$, $G_{mid}'(x)$ and $G_{high}'(x)$. The LTM gain may be the product of $g_{LTM,1}(x)$ and $g_{LTM,2}(x)$, as shown below in Equation (7).

$$g_{LTM}(x)=g_{LTM,1}(x)\times g_{LTM,2}(x) \quad \text{Equation (7)}$$

In one or more embodiments described herein, a spatial attenuation map may be used to reduce the effect of LTM inside regions of interest. A region of interest may include an area of the image that includes a particular object, such as a face, trees, sky, or the like. For example, the LTM block may use face detection information to reduce LTM effects on faces to avoid unpleasant images. In one or more embodiments, a radial spatial attenuation map may be used to reduce the effect of LTM inside regions of interest in pairs of fish-eye images. Both radial and spatial attenuation maps may be implemented in hardware, software, or both, and may be applied on standard rectangular images, circular images, or both.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   an image sensor configured to capture a first hyper-hemispherical image, wherein the first hyper-hemispherical image includes an image circle portion and a dark corner portion, wherein a circumference of the image circle portion represents a stitch line between the first hyper-hemispherical image and a second hyper-hemispherical image obtained from a second image sensor; and
   a processor configured to:
   perform local tone mapping (LTM) on a first area of pixels of the image circle portion, wherein the first area of pixels has a first radius relative to a center of the image circle portion;
   perform global tone mapping (GTM) on a second area of pixels of the image circle portion on a condition that a portion of a predefined area of pixels overlaps with the stitch line, wherein the second area of pixels has a second radius relative to the center of the image circle portion that is greater than the first radius;
   stitch the first hyper-hemispherical image and the second hyper-hemispherical image at the stitch line to obtain a processed image; and
   output the processed image.

2. The image capture device of claim 1, wherein the processor is configured to perform LTM on each pixel of the first area of pixels based on the predefined area of pixels.

3. The image capture device of claim 2, wherein the predefined area of pixels is a 100×100 pixel area.

4. The image capture device of claim 1, wherein the processor is configured to perform LTM on each pixel of the first area of pixels to remove low frequency variations.

5. The image capture device of claim 4, wherein the processor is configured to perform LTM on each pixel of the first area of pixels to preserve high frequency details.

6. The image capture device of claim 1, wherein the processor is configured to output the processed image in a 360 output format.

7. The image capture device of claim 6, wherein the 360 output format is a stitched pair fish-eye format, an equi-angular cubemap (EAC) format, or an equi-rectangular projection (ERP) format.

8. A method comprising:
   obtaining a hyper-hemispherical image that includes an image circle portion and a dark corner portion, wherein a circumference of the image circle portion represents a stitch line between the hyper-hemispherical image and another hyper-hemispherical image;
   dividing the hyper-hemispherical image into a plurality of blocks, wherein each of the plurality of blocks contains a predetermined number of pixels;
   determining whether a block of the plurality of blocks contains a portion of the image circle portion;
   on a condition that the block contains a portion of the image circle portion, determining whether the block overlaps the stitch line;
   on a condition that the block does not overlap with the stitch line, computing a neighborhood luminance of a pixel of the predetermined number of pixels and applying a gain to the pixel based on the neighborhood luminance;
   on a condition that the block overlaps with the stitch line, the method further comprising:
      determining a distance of the pixel from a center of the image circle portion;
      computing a luminance of the pixel;
      applying a gain to the pixel based on the luminance; and
      applying an attenuation map to the pixel based on the determined distance of the pixel from the center of the image circle portion;
   stitching the hyper-hemispherical image and the other hyper-hemispherical image at the stitch line to obtain a processed image; and
   outputting the processed image.

9. The method of claim 8 further comprising:
   dividing the other hyper-hemispherical image into a plurality of blocks, wherein each of the plurality of blocks contains a predetermined number of pixels.

10. The method of claim 8, wherein the neighborhood luminance is a weighted average luminance of the predetermined number of pixels.

11. The method of claim 8, wherein each block of the plurality of blocks has is a 100×100 pixel area.

12. The method of claim 8, wherein the attenuation map is applied to a smoothed luminance of the pixel.

13. The method of claim 8, wherein the attenuation map is applied to a local contrast enhancement strength of the pixel.

14. An image capture device comprising:
a first image sensor configured to capture a first hyper-hemispherical image, wherein the first hyper-hemispherical image includes a first image circle portion and a first dark corner portion, wherein a circumference of the first image circle portion represents a first stitch line;
a second image sensor configured to capture a second hyper-hemispherical image, wherein the second hyper-hemispherical image includes a second image circle portion and a second dark corner portion, wherein a circumference of the second image circle portion represents a second stitch line; and
a processor configured to:
perform local tone mapping (LTM) on a first area of pixels of the first image circle portion, wherein the first area of pixels has a first radius relative to a center of the first image circle portion;
perform global tone mapping (GTM) on a second area of pixels of the first image circle portion on a condition that a portion of a predefined area of pixels overlaps with the first stitch line, wherein the second area of pixels has a second radius relative to the center of the first image circle portion that is greater than the first radius;
stitch the first hyper-hemispherical image and the second hyper-hemispherical image at the first and second stitch lines to obtain a processed image; and
output the processed image.

15. The image capture device of claim 14, wherein the processor is further configured to:
perform LTM on a third area of pixels of the second image circle portion, wherein the third area of pixels has a third radius relative to a center of the second image circle portion; and
perform GTM on a fourth area of pixels of the second image circle portion on a condition that a portion of the predefined area of pixels overlaps with the second stitch line, wherein the fourth area of pixels has a fourth radius relative to the center of the second image circle portion that is greater than the third radius.

16. The image capture device of claim 15, wherein the processor is configured to perform LTM on each pixel of the first area of pixels and the third area of pixels based on the predefined area of pixels.

17. The image capture device of claim 15, wherein the predefined area of pixels is a 100×100 pixel area.

18. The image capture device of claim 15, wherein the processor is configured to perform LTM on each pixel of the first area of pixels and the third area of pixels to remove low frequency variations.

19. The image capture device of claim 18, wherein the processor is configured to perform LTM on each pixel of the first area of pixels and the third area of pixels to preserve high frequency details.

20. The image capture device of claim 14, wherein the processor is further configured to:
perform a combination of LTM and GTM on a fifth area of pixels of the first image circle portion, wherein the fifth area of pixels is between the first area of pixels and the second area of pixels, and wherein the combination is based on an attenuation map.

* * * * *